United States Patent
Hung et al.

(10) Patent No.: US 10,617,073 B2
(45) Date of Patent: Apr. 14, 2020

(54) SELF-WATERING PLANTER

(71) Applicant: The Ames Companies, Inc., Camp Hill, PA (US)

(72) Inventors: Chun W. Hung, Dillsburg, PA (US); Patrick Guillory, Smyrna, GA (US); Patricia Walesh, Austell, GA (US)

(73) Assignee: The Ames Companies, Inc., Camp Hill, PA (US)

( * ) Notice: Subject to any disclaimer, the term of this patent is extended or adjusted under 35 U.S.C. 154(b) by 1103 days.

(21) Appl. No.: 14/596,521

(22) Filed: Jan. 14, 2015

(65) Prior Publication Data
US 2016/0198648 A1 Jul. 14, 2016

(51) Int. Cl.
*A01G 27/00* (2006.01)
*A01G 27/04* (2006.01)
*A01G 9/02* (2018.01)

(52) U.S. Cl.
CPC .............. *A01G 27/005* (2013.01); *A01G 9/02* (2013.01); *A01G 27/04* (2013.01)

(58) Field of Classification Search
CPC .......... A01G 9/02; A01G 27/04; A01G 27/06; A01G 27/005; A01G 27/02; A01G 29/00; A01G 27/006; A01G 27/003; A01G 27/001; A01G 9/10; A01G 13/0212; A01G 25/16; A01G 9/247
USPC ........ 47/81, 79, 48.5, 29.5, 39, 44, 58.1 SC, 47/59 R, 65
See application file for complete search history.

(56) References Cited

U.S. PATENT DOCUMENTS

| | | | |
|---|---|---|---|
| 3,471,968 A * | 10/1969 | Letz | A01G 9/122 248/125.3 |
| 3,958,366 A | 5/1976 | Meyers | |
| D250,401 S | 11/1978 | O'Shea et al. | |
| 4,170,089 A | 10/1979 | Smrt | |
| 4,173,097 A | 11/1979 | Staby | |
| 4,183,175 A | 1/1980 | Magee | |

(Continued)

FOREIGN PATENT DOCUMENTS

EP 2392207 12/2011

OTHER PUBLICATIONS

Australian First Examination Report for Application No. 2015268692, dated Mar. 12, 2019, 4 pages.

*Primary Examiner* — Peter M Poon
*Assistant Examiner* — Jeffrey R Larsen
(74) *Attorney, Agent, or Firm* — Brooks Kushman P.C.

(57) ABSTRACT

A watering assembly is provided. The watering assembly includes a reservoir body, a support assembly, a wicking assembly, and an inlet assembly. The reservoir body defines an enclosed space. The support assembly is structured to support soil. The support assembly is coupled to the reservoir body. The wicking assembly includes a number of wicking elements; the wicking elements are coupled to at least one of the reservoir body or support assembly. The wicking elements extend from the reservoir enclosed space to a location outside the reservoir enclosed space. The inlet assembly is coupled to the reservoir body and structured to provide fluid communication from a location outside the reservoir enclosed space to the reservoir enclosed space. When the reservoir body, the support assembly, the wicking assembly and the inlet assembly are assembled, the reservoir body, the support assembly, the wicking assembly and the inlet assembly form a contained watering assembly.

20 Claims, 5 Drawing Sheets

(56) References Cited

U.S. PATENT DOCUMENTS

| | | | |
|---|---|---|---|
| 4,216,880 A * | 8/1980 | Drelichowski | B65D 25/465 |
| | | | 222/528 |
| 4,356,665 A * | 11/1982 | de Oliveira | A01G 27/04 |
| | | | 47/80 |
| D296,089 S | 6/1988 | Pouliot | |
| 4,962,613 A | 10/1990 | Nalbandian | |
| 4,993,186 A | 2/1991 | Immonen | |
| 5,010,687 A | 4/1991 | Hougard | |
| 5,040,330 A | 8/1991 | Belgiorno | |
| 5,046,282 A | 9/1991 | Whitaker | |
| 5,099,609 A | 3/1992 | Yamauchi | |
| 5,174,062 A | 12/1992 | Kim | |
| 5,481,826 A | 1/1996 | Dickinson et al. | |
| 5,502,924 A | 4/1996 | Lee | |
| 5,542,605 A | 8/1996 | Campau | |
| 5,596,839 A | 1/1997 | Ellis-El | |
| 5,622,004 A | 4/1997 | Gidge | |
| 5,638,638 A | 6/1997 | Moskowitz | |
| 5,647,170 A | 7/1997 | Holtkamp, Jr. | |
| D384,907 S | 10/1997 | Moskowitz | |
| D385,213 S | 10/1997 | McAllister | |
| 5,678,600 A | 10/1997 | Locke et al. | |
| 5,722,201 A | 3/1998 | Diorio et al. | |
| 5,782,035 A | 7/1998 | Locke et al. | |
| 5,852,896 A | 12/1998 | Flasch, Jr. | |
| 5,921,025 A | 7/1999 | Smith | |
| 5,934,017 A * | 8/1999 | Ho | A01G 27/02 |
| | | | 47/48.5 |
| 6,079,156 A | 6/2000 | Colovic | |
| 6,098,850 A | 8/2000 | Ho | |
| 6,128,856 A | 10/2000 | Doan | |
| 6,131,334 A | 10/2000 | Fan | |
| 6,134,833 A | 10/2000 | Bachman et al. | |
| 6,182,394 B1 | 2/2001 | Bassler | |
| 6,205,706 B1 | 3/2001 | Buss | |
| 6,226,920 B1 | 5/2001 | Myers | |
| 6,226,921 B1 | 5/2001 | Kang | |
| 6,233,871 B1 | 5/2001 | Ho | |
| 6,357,179 B1 | 3/2002 | Buss | |
| 6,374,541 B1 | 5/2002 | Ho | |
| 6,401,389 B1 | 6/2002 | Mount et al. | |
| D460,717 S | 7/2002 | Fan | |
| 6,418,663 B1 | 7/2002 | Smith | |
| 6,418,664 B1 | 7/2002 | Shaw | |
| 6,584,730 B1 | 7/2003 | Mai | |
| 6,715,233 B2 | 4/2004 | Lyon | |
| 6,783,023 B1 | 8/2004 | Fan | |
| 6,845,588 B2 | 1/2005 | Muxlow | |
| 6,862,843 B2 | 3/2005 | Missry | |
| 6,986,224 B2 | 1/2006 | Gelfer | |
| 7,222,454 B1 | 5/2007 | Chen | |
| 7,634,871 B2 | 12/2009 | DiPaolo | |
| 7,690,150 B2 | 4/2010 | Orschulik | |
| 7,690,151 B2 | 4/2010 | Wilkes | |
| 7,707,771 B1 | 5/2010 | Hawkins | |
| 7,810,278 B2 | 10/2010 | Hui | |
| 7,823,326 B2 | 11/2010 | Hui | |
| 7,832,146 B2 | 11/2010 | Gordon | |
| 7,845,110 B2 | 12/2010 | Amsellem | |
| 7,856,755 B2 | 12/2010 | Riesterer | |
| D635,486 S | 4/2011 | Bodum | |
| 2012/0066971 A1 * | 3/2012 | Lin | A01G 27/02 |
| | | | 47/80 |
| 2016/0192604 A1 * | 7/2016 | Prescott | A01G 9/025 |
| | | | 47/81 |

* cited by examiner

SELF-WATERING PLANTER

BACKGROUND OF THE INVENTION

Field of the Invention

The disclosed and claimed concept relates to a watering assembly for a planter assembly and, more specifically, to a contained watering assembly that is placed in a reduced space configuration for shipping and storage.

Background Information

Planter assemblies are well known. A planter assembly includes a base member and a sidewall defining an enclosed space. The planter assembly enclosed space is filled with soil and a number of plants. Such a planter assembly, however, has a limited volume, of which only a portion may contain water intermixed with the soil. Such a limited quantity of water is absorbed by the plant(s) or evaporates in a brief period of time. Accordingly, self-watering planter assemblies have been developed.

A self-watering planter includes a reservoir for holding water. The reservoir is in fluid communication with the soil in the planter assembly. There are a number of general configurations that self-watering planters utilize. One configuration provides for the self-watering assembly to enclose the planter assembly. That is, the planter assembly is, essentially, disposed within the self-watering assembly. The disadvantage to this configuration is that the self-watering assembly is larger than the planter assembly. This larger size generally means that the self-watering assembly is more expensive than the planter assembly. Further, such a self-watering assembly occupies more space during shipping and storage than the associated planter assembly. Further, in this configuration, the self-watering assembly is structured to be coupled to a planter assembly of a specific size and configuration. That is, the self-watering assembly cannot be used with different planter assemblies.

Another configuration of a self-watering assembly provides a reservoir that is separate from the planter assembly. In this configuration, the self-watering assembly is coupled to the planter assembly by tubes or conduits. Such tubes may leak. Further, for aesthetic reasons, the planter assembly and the self-watering assembly are often disposed in a larger, separate shell so as to hide the separate assemblies. This configuration is also expensive and occupies more space during shipping and storage than a single unit.

Other self-watering assemblies are incorporated into the planter assembly. That is, the self-watering assembly cannot be separated from the planter assembly. This is a disadvantage as such a self-watering assembly cannot be used in another planter that lacks a self-watering assembly.

Further, self-watering assemblies tend to be shipped and sold in either a fully assembled configuration or a disassembled configuration. Each of these configurations have disadvantages. When shipped and sold in a fully assembled configuration, the self-watering assemblies occupy a larger volume meaning shipping costs are increased and the units occupy more space on, for example, a seller's self. Conversely, users dislike assembling planters and self-watering assemblies and may assembly such units incorrectly.

There is, therefore, a need for a watering assembly for a planter assembly that is a contained watering assembly and which may be placed in a reduced space configuration.

SUMMARY OF THE INVENTION

These needs, and others, are met by at least one embodiment of the disclosed and claimed concept which provides for a contained watering assembly and which may be placed in a reduced space configuration. As a "contained watering assembly" the watering assembly fits within a planter assembly and, as such, does not need to be coupled to the planter assembly by tubes or other constructs that may leak. Further, a "contained watering assembly" is smaller than the planter assembly and, as such, cost less to make, ship and store. Further, the disclosed and claimed watering assembly is movable between a "reduced space configuration" and a number of operational configurations. As the watering assembly can be placed in a "reduced space configuration," the watering assembly occupies less volume during shipping and storage.

In an exemplary embodiment, the watering assembly includes a reservoir body, a support assembly, a wicking assembly, and an inlet assembly. The reservoir body defines an enclosed space. The support assembly is structured to support soil. The support assembly is coupled to the reservoir body. The wicking assembly includes a number of wicking elements; the wicking elements are coupled to at least one of the reservoir body or support assembly. The wicking elements extend from the reservoir enclosed space to a location outside the reservoir enclosed space. The inlet assembly is coupled to the reservoir body and structured to provide fluid communication from a location outside the reservoir enclosed space to the reservoir enclosed space. When the reservoir body, the support assembly, the wicking assembly and the inlet assembly are assembled, the reservoir body, the support assembly, the wicking assembly and the inlet assembly form a contained watering assembly.

In a further embodiment, the inlet assembly includes a telescoping funnel assembly structured to move between a collapsed, first configuration, wherein the funnel assembly has a minimal length, and a number of expanded, operational configurations, wherein the funnel assembly has an extended length or a maximum length. Further, the funnel assembly is pivotally coupled to the support assembly and structured to move between a generally horizontal, first position, and a generally vertical, second position. In this configuration, the watering assembly is structured to move between a reduced space configuration and a number of operational configurations.

The disclosed concept relies upon the configuration of the noted elements, i.e., the size, shape, and position of the reservoir body, the support assembly, the wicking assembly, and the inlet assembly, to solve the stated problems. Thus, for example, in a claim that recites the reduced space configuration of the watering assembly, the reduced space configuration, stated as a percentage of the squared out volume an operational configuration of the watering assembly, is a critical feature.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
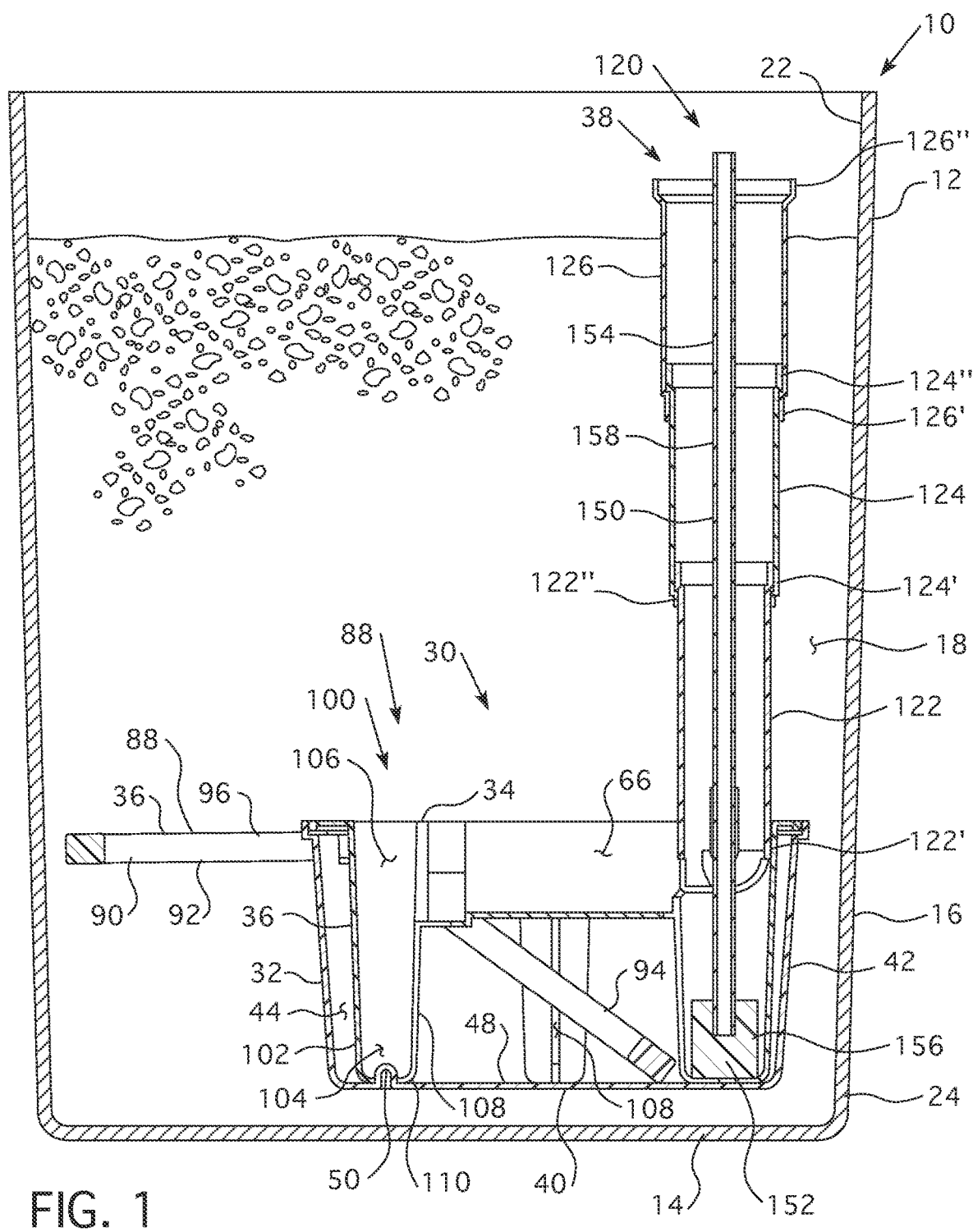
FIG. 1 is a cross-sectional side view of a planter assembly.

As used herein, directional terms, such as, but not limited to, "forward," "back," "right," "left," "upper," "lower" and "lateral" correspond to the orientation of a planter as shown in the Figures. Such directional terms are not limiting upon the claims.

As used herein, the singular form of "a," "an" and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components.

As used herein, the word "unitary" means that a component is created as a single piece or unit. That is, a component that includes pieces that are created separately and then coupled together as a unit is not a "unitary" component or body. A component having a body with a poly material molded about a substrate is not a "unitary" body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond," when used in conjunction with a description of an element's shape or size, indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. In reference to contours, perimeters and similar constructs, "correspond" means the constructs have similar contours, perimeters, shapes, and/or characteristics.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function.

As used herein, a "planar body" or "planar member" is a generally thin element including opposed, wide, generally parallel surfaces as well as a thinner edge surface extending between the wide parallel surfaces.

As used herein, a "planar surface" is one of the opposed, wide, generally parallel surfaces of the "planar member."

As used herein, "squared out" volume means the minimum right parallelepiped (box shaped) volume that encloses a selected object. For example, a sphere having a two-inch radius has a volume ($V=(4/3) \times \pi \times r^3$) of 33.51 in$^3$. The minimum right parallelepiped volume ($V=\text{length} \times \text{width} \times \text{height}$) that encloses that sphere is a box having four-inch sides and a volume of 64.0 in$^3$; thus, the "squared out" volume of a sphere having a two-inch radius is 64.0 in$^3$.

As shown in FIG. 1, and in an exemplary embodiment, a planter assembly 10 includes body 12 with a base member 14 and an upwardly depending sidewall 16. That is, an "upwardly depending sidewall," as used herein, is a sidewall extending upwardly from the periphery of the base member. The planter assembly body base member 14 may have any shape but, in an exemplary embodiment and as shown in the figures, is generally planer and generally circular. In this configuration, the planter assembly body 12 defines a generally enclosed space 18. Further, as is shown, the planter assembly body sidewall 16 is tapered from a wider upper end 22 to a more narrow lower end 24. The planter assembly body 12 may include other features such as, but not limited to, a drain opening (not shown). As is known, the planter assembly body 12 is structured to generally enclose a growing substrate such as, but not limited to, soil, dirt, loam, and any other mixture of minerals, organic matter, gases, liquids, and the myriad of organisms that together support plant life (hereinafter, and collectively, "soil").

The planter assembly 10 further includes a watering assembly 30, as shown in FIGS. 1-5. In an exemplary embodiment, the watering assembly 30 is a "contained watering assembly." As used herein, a "contained watering assembly" is a construct that is structured to fit within a planter assembly body enclosed space 18 and to store a quantity of water. As used herein, however, a "contained watering assembly" is not structured to enclose a quantity of soil, sufficient to support a plant or other growth, i.e. soil with a depth of about two inches or less. That is, a "contained water assembly" is separate from a planter assembly body 12. A "contained watering assembly" may, however, include a structure such as an upper collar that supports a small quantity of soil. Thus, a planter assembly 10 in a configuration wherein the planter assembly body 12 is structured to enclose a quantity of soil is disposed within the enclosed space 18 defined by a watering assembly 30 is not a "contained watering assembly" as used herein. Further, the watering assembly 30 of such a planter assembly 10 is not a "contained watering assembly." Further, as used herein, "structured to fit within a planter assembly body enclosed space" 18 means that the contained watering assembly 30 is intended to be disposed in a planter assembly body enclosed space 18. Thus, a construct that is merely capable of being disposed in a planter assembly body enclosed space 18 is not "structured to fit within a planter assembly body enclosed space" 18 and, therefore, cannot be a "contained watering assembly." For example, disposing the self-watering planter disclosed in U.S. Pat. No. 4,356,665 in a lager planter assembly body enclosed space 18 does not make the self-watering planter a "contained watering assembly" in that it (1) is not intended to be disposed in a planter assembly body enclosed space 18, and (2) is structured to enclose a quantity of soil sufficient to support a plant.

The watering assembly 30, in an exemplary embodiment, is further structured to move between a reduced space configuration and a number of expanded, operational configurations. In an exemplary embodiment, the watering assembly 30 may be placed in at least a first operational configuration and a second operational configuration, as detailed below. As used herein, a "reduced space configuration" means that a number of elements of the watering assembly 30 are fully assembled, i.e. coupled, but are movable between one or more positions and/or configurations wherein the watering assembly 30 occupies a smaller "squared out" volume than when in an operational configuration. More specifically, as used herein, the watering assembly 30 in the "reduced space configuration" occupies a "squared out" volume between about 30% to 40% of the "squared out" volume of the first operational configuration, and, between about 20% to 30% of the "squared out" volume of the second operational configuration, as defined below. Further, as used herein, a watering assembly 30 in a "prime reduced space configuration" occupies a "squared out" volume of about 35% of the "squared out" volume of the first operational configuration, and, between about 25% of the "squared out" volume of the second operational configuration.

As used herein, an "operational configuration" of the watering assembly 30 when the movable elements are in a use position/configuration. The following description shall discuss the elements of an exemplary embodiment watering assembly 30 before discussing the watering assembly 30 in a "reduced space configuration" and an "operational configuration."

In an exemplary embodiment, the watering assembly 30 includes a reservoir body 32, a support assembly 34, a wicking assembly 36, and an inlet assembly 38. In an exemplary embodiment, the reservoir body 32 includes a base member 40 and an upwardly depending sidewall 42.

Figure 2:
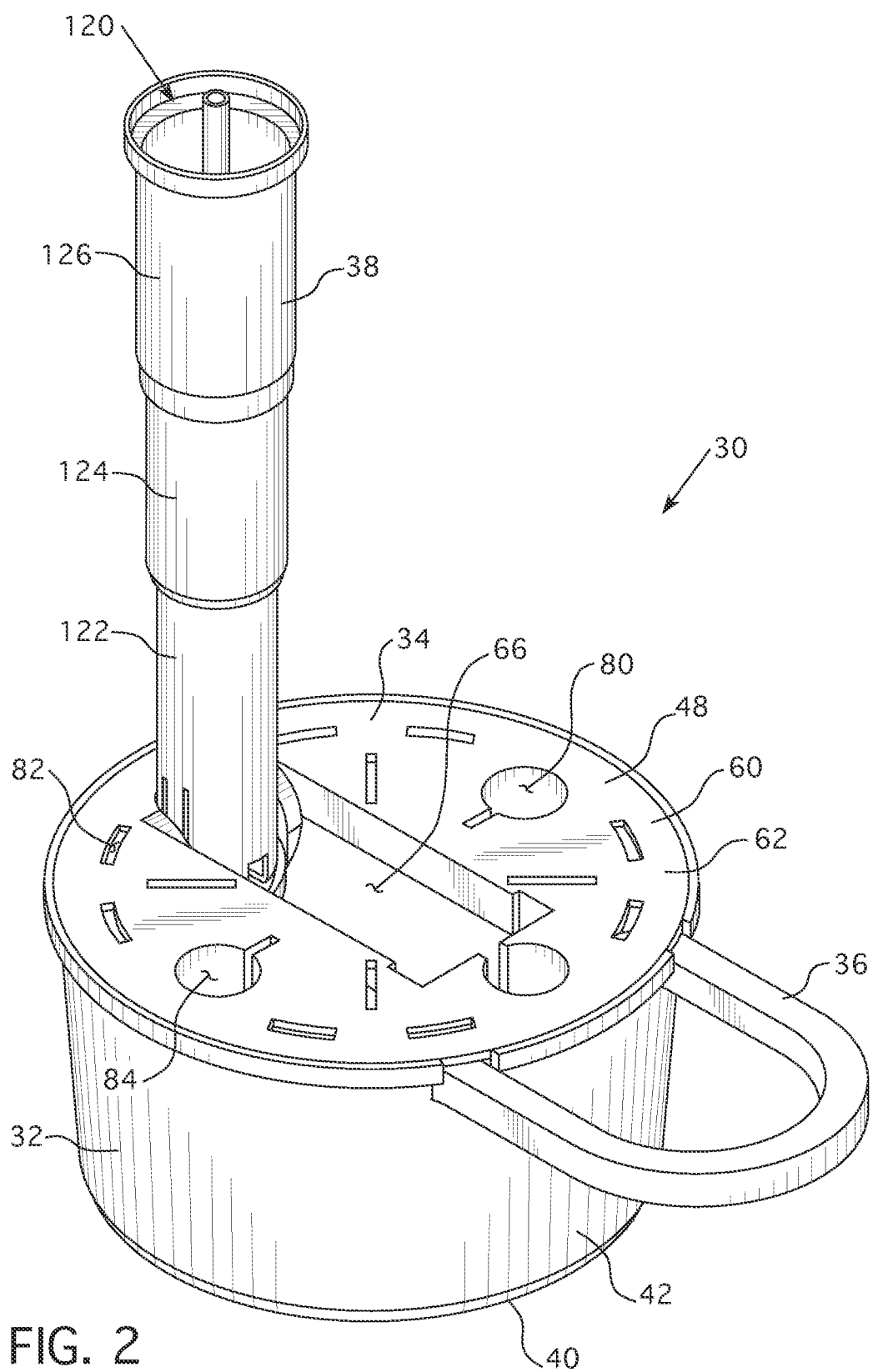
FIG. 2 is an isometric view of a watering assembly.

The reservoir body 32 defines an enclosed space 44, i.e. a generally cup-shaped enclosed space with one substantially open end. In an exemplary embodiment, the reservoir body sidewall 42 includes a number of passages 46 (FIG. 2). As discussed below, the reservoir body sidewall passages 46 are sized to correspond to an directed capillary action assembly 90. Further, in an exemplary embodiment, the surface of the reservoir body base member 40 in the reservoir body enclosed space 44, i.e. the reservoir body base member upper surface 48 includes a number of lugs 50. The reservoir body base member upper surface lugs 50 are positioned and sized to correspond to the tubular member detents 112, discussed below. In an exemplary embodiment, the reservoir body 32 is a unitary body.

In an exemplary embodiment, not shown, the reservoir body 32 includes a number of circumferential (which, as used herein, includes perimeter for non-circular shapes) bellows. The bellows is a pleated accordion-like construct that allows the reservoir body 32 to move between a collapsed, first configuration, and, a number of expanded, second configuration including a configuration with a maximum reservoir body 32 volume. In an exemplary embodiment, the difference in the height of the reservoir body 32 between the first and second configurations allows the watering assembly 30 to move between a reduced space configuration and an expanded, operational configuration.

The support assembly 34 is structured to support, but not enclose, a quantity of soil. In an exemplary embodiment, the support assembly 34 includes a support member 60 with an upper surface 62 and a lower surface 64. As shown, and in an exemplary embodiment, the support member 60 is a generally planar member. The support member upper surface 62 defines an inlet assembly cavity 66. The inlet assembly cavity 66 is sized and shaped to enclose a portion of the inlet assembly 38 when it is in a first position and first configuration, as discussed below. In an exemplary embodiment, the inlet assembly cavity 66 is defined by a semi-cylindrical sidewall 68 (FIG. 4) that extends below the plane of the support member 60. The support member 60 further includes an inlet assembly coupling 70. In an exemplary embodiment, the support member inlet assembly coupling 70 (FIG. 3) is a pair of opposed, generally circular openings 72 in the cavity sidewall 68. Further, the support member 60 includes a number of generally vertical passages 80 extending between the support member upper surface 62 and the support member lower surface 64. As shown, the support member passages 80 include elongated slots 82 as well as generally circular passages 84. In an exemplary embodiment, the support member 60 has a size and cross-sectional shape that substantially corresponds to the open upper end of the reservoir body 32.

The wicking assembly 36, in an exemplary embodiment, includes a wicking element 88 which is at least one of a directed capillary action assembly 90 or a natural capillary action assembly 100. The wicking assembly, in an exemplary embodiment, includes both a directed capillary action assembly 90 and a natural capillary action assembly 100. A directed capillary action assembly 90, as used herein, generally directs a fluid over the directed capillary action assembly 90, For example, in an exemplary embodiment, the directed capillary action assembly 90 includes an elongated wick member 92 with a first portion 94 and a second portion 96. The wick member 92 may be any construct that provides fluid transfer via capillary action such as, but not limited to, natural sponge, artificial sponge, or bundled fibers. As described below, the wick member first portion 94 is disposed in the reservoir body enclosed space 44, which is filled with fluid such as, but not limited to, water. The wick member second portion 96 is disposed outside said reservoir body enclosed space 44. Capillary action draws the fluid, i.e. directs the fluid, along the wick member 92 thereby transferring the fluid from the reservoir body enclosed space 44 to a location outside the reservoir body enclosed space 44.

The natural capillary action assembly 100 provides less direction to the flow of a fluid via capillary action. In an exemplary embodiment, the natural capillary action assembly 100 includes a number of tubular members 102 each defining a generally enclosed space 104. Each tubular member 102 depends downwardly from the support assembly support member lower surface 64. Each tubular member 102 includes an upper opening 106 and a number of lower openings 108 (FIG. 1) which are shown as generally vertical slots. Each tubular member upper opening 106 and lower opening 108 is in fluid communication with the tubular member enclosed space 104. Each tubular member upper opening 106 is in fluid communication with a support assembly support member vertical passage 80 and, as shown, a support assembly support member circular passages 84.

As described below, when the watering assembly 30 is disposed in a planter assembly body enclosed space 18 and that enclosed space 18 is filled with soil, a portion of the soil fills each tubular member enclosed space 104. Further, when the tubular members 102 are disposed in the reservoir body enclosed space 44, which is filled with water, as described below, water passes through each tubular member lower opening 108. The water contacts the soil which acts as a wick. That is, the interaction of the water surface tension with the soil draws water upwardly through each tubular member enclosed space 104. The water then passes through the support assembly support member circular passages 84 associated with each tubular member 102 and into the planter assembly body enclosed space 18. As it is understood that the watering assembly 30 is to be disposed within soil, the "natural capillary action assembly 100" is, as used herein, completely formed by the tubular members 102 as described above. That is, the soil is not, as used herein, part of the "natural capillary action assembly 100."

Further, in an exemplary embodiment, each tubular member 102 is unitary with the support assembly support member 60. That is, the tubular members 102 and the support assembly support member 60 are molded as a single piece. In this exemplary embodiment, each tubular member 102 includes a lower axial member 110 including a detent 112 (FIG. 2). The tubular members 102 are positioned on the support assembly support member 60 so that the position of the tubular member detents 112 align reservoir body base member upper surface lugs 50.

The inlet assembly 38 is structured to provide a passage for a fluid, such as, but not limited to water, from above the soil in the planter assembly body enclosed space 18 to the reservoir body enclosed space 44. In an exemplary embodiment, the inlet assembly 38 includes a telescoping funnel assembly 120 structured to move between a collapsed, first configuration, wherein the funnel assembly 120 has a minimal length, and a number of expanded, operational configurations, wherein the funnel assembly 120 is vertical or has a has a maximum length. That is, it is understood that different planter assembly bodies 12 may have a different depths. The telescoping funnel assembly 120 may be adjusted to a height such that the top of the telescoping funnel assembly 120 is at, or just above, the soil level, for planter assembly bodies 12 of different sizes.

In an exemplary embodiment, as shown, the funnel assembly 120 includes three hollow, generally circular members 122, 124, 126, which are numbered in ascending order when the funnel assembly 120 is in the operational configuration. Each funnel assembly member 122, 124, 126 includes an upper end 122', 124', 126', and a lower end 122", 124", 126". Thus, the upper funnel member upper end 126' is also the funnel assembly upper end. As is known, the funnel assembly members 122, 124, 126 have a similar cross-sectional shape, but with slightly different cross-sectional areas. In this configuration, the funnel assembly members 122, 124, 126 can be assembled in a concentric relationship. Further, the funnel assembly member upper ends 122', 124' of the inner funnel assembly members 122, 124 are structured so that the inner funnel assembly member upper ends 122', 124' cannot pass the next outer funnel assembly member lower ends 124", 126", respectively. In an exemplary embodiment, the outer funnel assembly member lower ends 124", 126" have a reduced diameter relative to the adjacent inner funnel assembly members upper ends 122', 124'. As shown, and in an exemplary embodiment, the funnel assembly member 126 with the greatest cross-sectional area is the upper most of the telescoping members.

Figure 3:
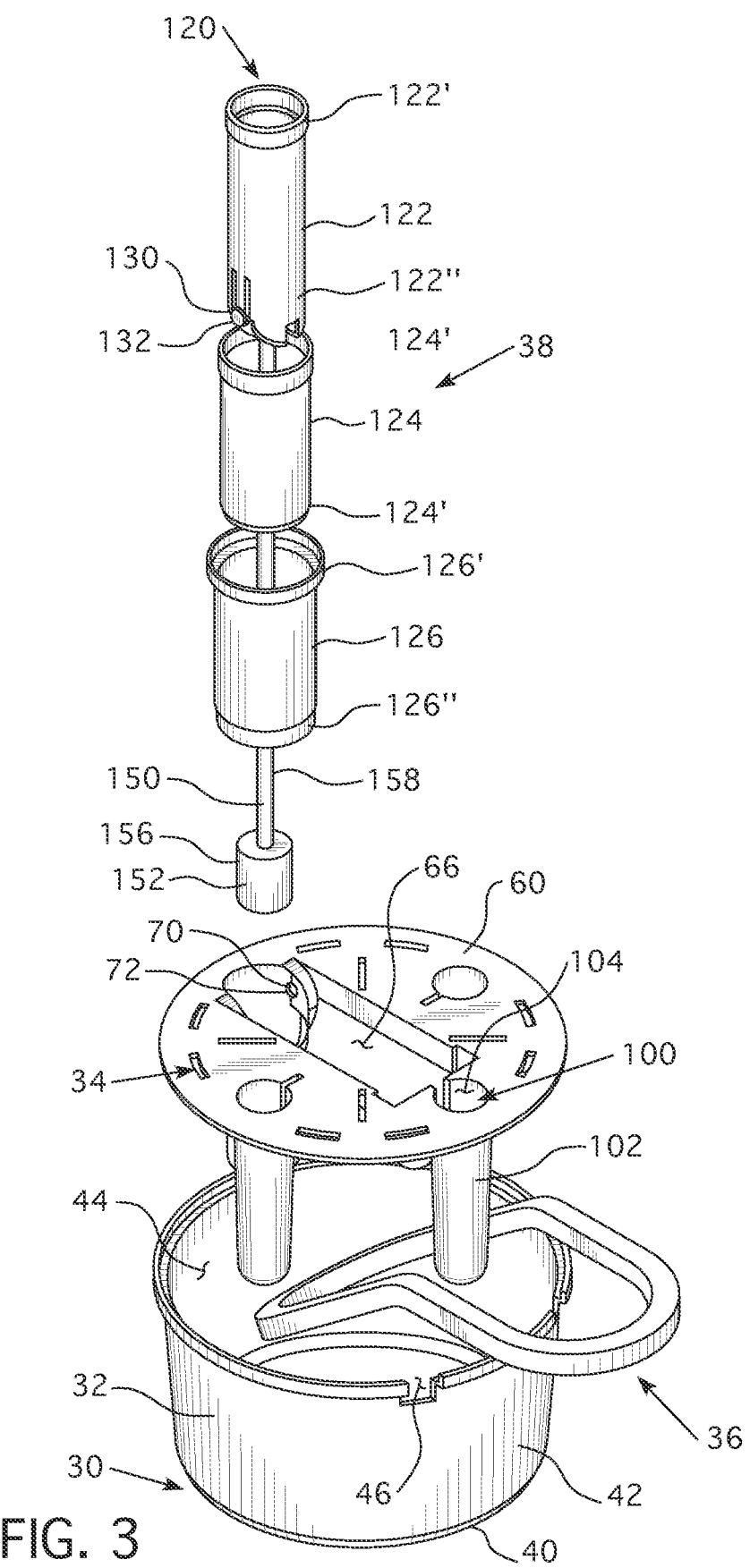
FIG. 3 is an exploded isometric view of a watering assembly.
Figure 4:
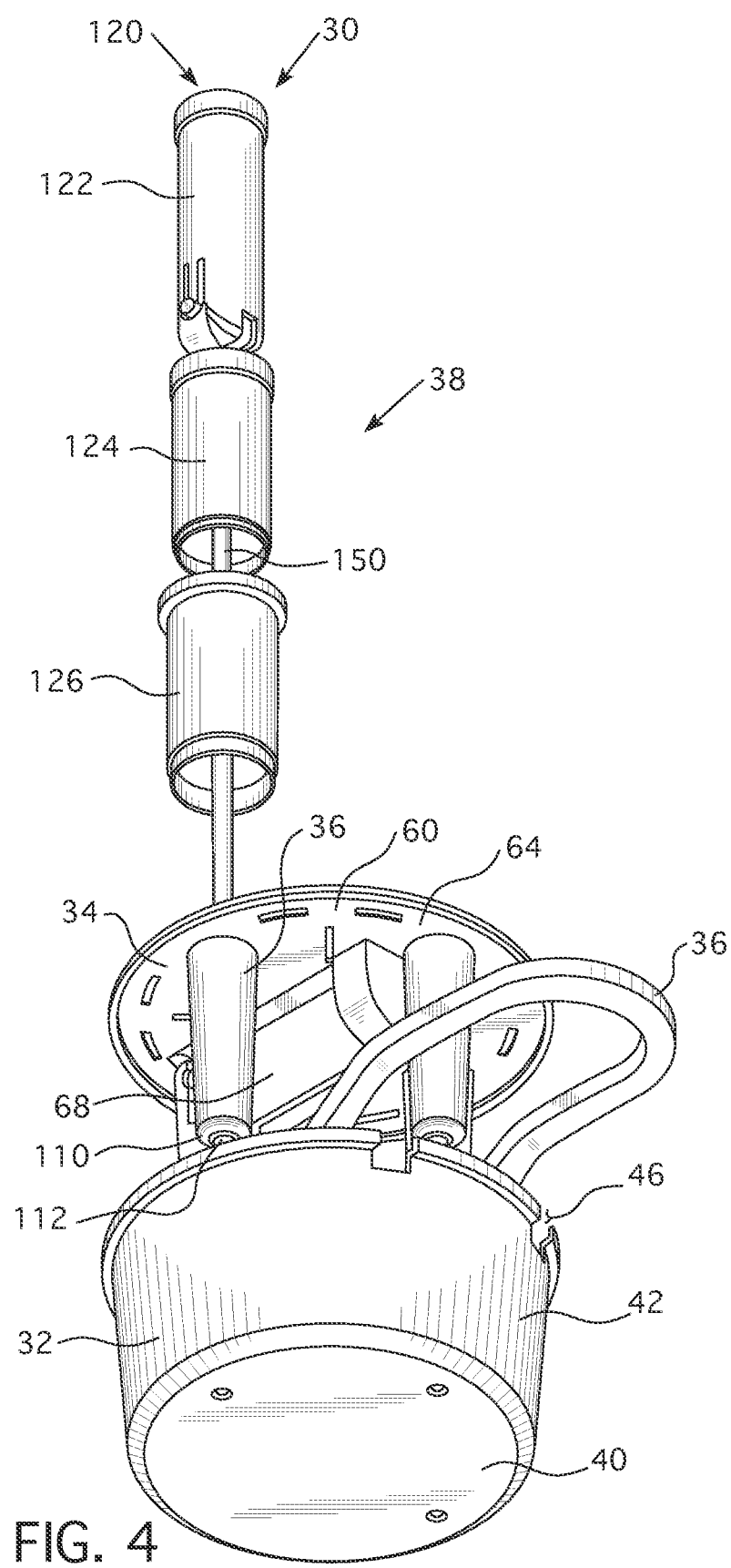
FIG. 4 is another exploded isometric view of a watering assembly.
Figure 5:
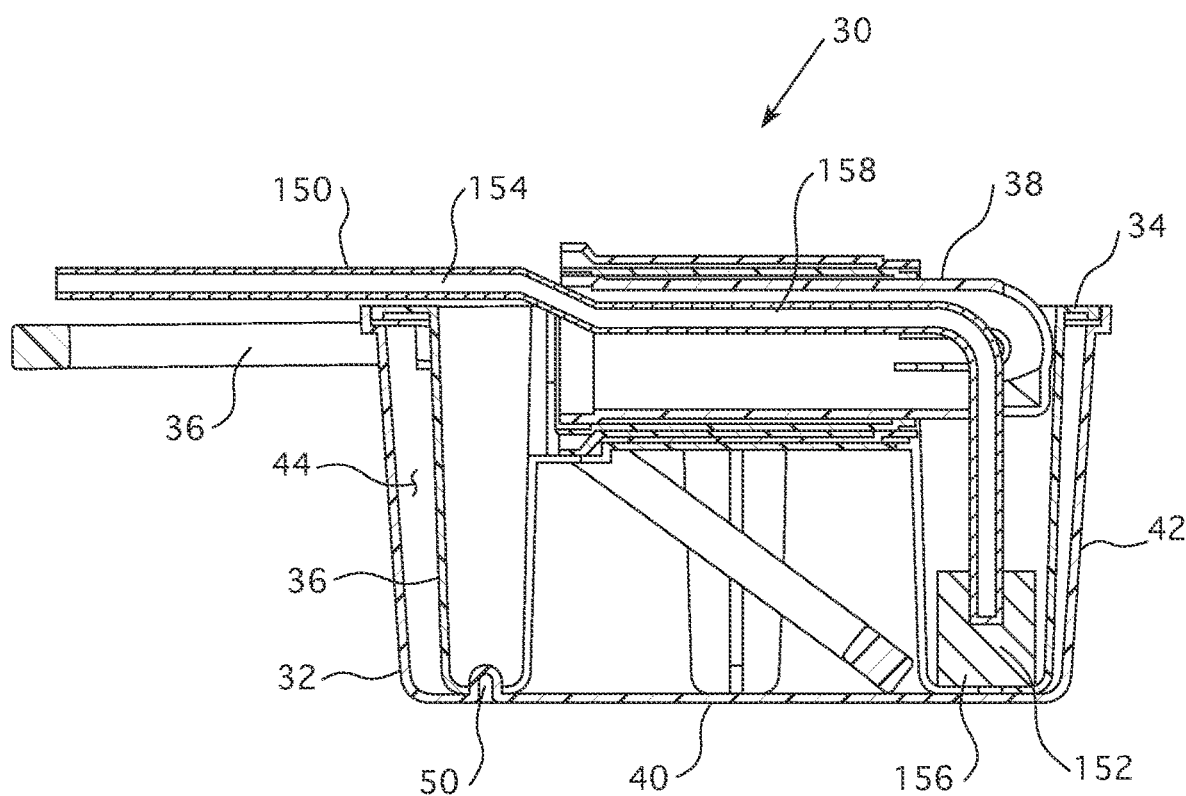
FIG. 5 is a cross-sectional side view of a watering assembly in a reduced space configuration.

Further, the lowest funnel assembly member 122 includes a support assembly pivot coupling 130 (FIG. 3). In an exemplary embodiment, wherein the inlet assembly coupling 70 is a pair of opposed, generally circular openings 72 in the cavity sidewall 68, the funnel assembly support assembly pivot coupling 130 is a pair of opposed pins 132 structured to be rotatable coupled to the inlet assembly coupling openings 72.

Further, in an exemplary embodiment, the inlet assembly 38 includes a water level indicator assembly 150. In an exemplary embodiment, the water level indicator assembly 150 includes a buoyant member 152 and a flexible elongated member 154. The buoyant member 152, as shown is, but is not limited to, a foam member 156. The flexible elongated member 154 as shown is, but is not limited to, a rubber tube 158. The indicator assembly 150 is disposed in the hollow space of the funnel assembly 120.

The watering assembly 30 is assembled as follows. The wick member first portion 94 is disposed in the reservoir body enclosed space 44 and the wick member second portion 96 is disposed outside said reservoir body enclosed space 44. That is, the wick member 92 passes through the reservoir body sidewall 42 passages 46. As shown, in an exemplary embodiment, the wick member 92 is a loop of sponge material. The inlet assembly 38, and in an exemplary embodiment, the telescoping funnel assembly 120, is pivotally coupled to the support assembly 34. That is, in an exemplary embodiment, the funnel assembly pins 132 are rotatably disposed in the inlet assembly coupling openings 72. The support assembly 34 is coupled to the reservoir body 32. In an exemplary embodiment, the support member 60 is fitted into the open upper end of the reservoir body 32. The reservoir body 32, in an exemplary embodiment, includes a ledge to support the support member 60. Further, the natural capillary action assembly tubular members 102 are disposed within the reservoir body enclosed space 44 with the tubular member detents 112 coupled to the reservoir body base member upper surface lugs 50.

In this configuration, the support member 60, which in an exemplary embodiment is unitary with natural capillary action assembly tubular members 102, resists movement, i.e. rotation, relative to the reservoir body 32 due to the coupling of the tubular member detents 112 with the reservoir body base member upper surface lugs 50. Further, the funnel assembly 120 is pivotally coupled to the support assembly 34 and is structured to move between a generally horizontal, first position, and a generally vertical, second position. When the funnel assembly 120 is in the first configuration and the first position, the funnel assembly 120 is partially disposed in the inlet assembly cavity 66.

Further, the funnel assembly 120 is structured to move between a collapsed, first configuration, wherein the funnel assembly 120 has a minimal length, and a number of expanded, operational second configurations (hereinafter "operational configuration"), wherein the funnel assembly 120 is partially or fully extended. For the sake of an example, and as used herein, the telescoping funnel assembly 120 may be positioned in a "first operational configuration," wherein the telescoping funnel assembly 120 in minimally extended. As used herein, a "minimally extended" telescoping assembly means that the telescoping members are in the collapsed, first configuration, or only slightly extended relative to each other. That is, "first operational configuration" may be the same as the collapsed, first configuration. Further, a "second operational configuration" means that the telescoping funnel assembly 120 is fully extended. It is understood that there a number of intermediate configurations between the first and second operational configurations. Thus, as used herein, "operational configuration" means any configuration between, and including, the first operational configuration and the second operational configuration and wherein the funnel assembly 120 has an extended vertical length relative to the collapsed, first configuration.

In an exemplary embodiment, the inlet assembly coupling 70, and therefore the funnel assembly 120, is disposed at a selected support member 60. In this configuration, water level indicator assembly foam member 156 is disposed in the selected support member 60. Further, water level indicator assembly rubber tube 158 folds or otherwise bends as funnel assembly 120 moves between the first and second position and between the first and second configurations. Further, when the funnel assembly 120 is in the first position and first configuration, the funnel assembly 120 is partially disposed in the inlet assembly cavity 66.

When the funnel assembly 120 is in the first position and first configuration, the watering assembly 30 is in a reduced space configuration. When the funnel assembly 120 is in the second position and an operational configuration, the watering assembly 30 is ready for use, i.e. a use configuration. Thus, the watering assembly 30 may be packaged, shipped, sold, etc. in the reduced space configuration. The watering assembly 30 is placed in the use configuration when disposed in a planter assembly body 12. Further, the wick member 92 may be disposed entirely within the reservoir body 32 when the watering assembly 30 is in the reduced space configuration. Further it is noted that when the funnel assembly 120 is in said first configuration and said first position, the height of the contained watering assembly 30 is between about 50% to 65% of the height of the contained watering assembly 30 when the funnel assembly 120 is in the second operational configuration and said second position That is, when the funnel assembly 120 is in the second position and an operational configuration, the watering assembly 30 is disposed in a planter assembly 10, i.e. in a planter assembly body enclosed space 18. The planter assembly body enclosed space 18 is then filled with soil while leaving the upper end of the inlet assembly 38 exposed. That is, funnel assembly member upper end 126' is exposed at, or above, the top of the soil. Further, as soil is added to the planter assembly body enclosed space 18, a portion of the soil fills the tubular members 102 thereby allowing the natural capillary action assembly 100 to operate as described above. The support assembly 34, however, substantially prevents soil from entering the reservoir body enclosed space 44. It is understood, however, that some soil may pass the support assembly 34 and fall into the reservoir body enclosed space 44.

In this configuration, and when the reservoir body 32, the support assembly 34, the wicking assembly 36, and the inlet assembly 38 are assembled, these elements form a contained watering assembly.

Further, in this configuration, a user fills the watering assembly 30 by pouring water, or another fluid, through the inlet assembly 38 thereby filling the reservoir body 32 with fluid. The fluid is absorbed by the wicking assembly 36 and is transferred upwardly into the soil within the planter assembly body enclosed space 18. Thus, any plant within the planter assembly body enclosed space 18 is watered.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A watering assembly for a generic planter, said planter including a body with a base member and an upwardly depending sidewall, said planter body defining an enclosed space, said watering assembly comprising:
   a reservoir body defining an enclosed space;
   a support assembly;
   a first wicking assembly;
   an inlet assembly;
   said support assembly structured to support a particulate material;
   said support assembly coupled to said reservoir body;
   said first wicking assembly including at least one first wicking element, said at least one first wicking element having a first portion at least partially disposed in said reservoir enclosed space and having a second portion that extends through a sidewall of the reservoir body to a location outside said reservoir enclosed space;
   said inlet assembly coupled to said reservoir body and structured to provide fluid communication from a location outside said reservoir enclosed space to said reservoir enclosed space; and
   wherein, when said reservoir body, said support assembly, said first wicking assembly and said inlet assembly are assembled, said reservoir body, said support assembly, said first wicking assembly and said inlet assembly form a contained watering assembly.

2. The watering assembly of claim 1 wherein:
   said inlet assembly includes a telescoping funnel assembly structured to move between a collapsed, first configuration, wherein the funnel assembly has a minimal length, and an expanded, operational configuration, wherein the funnel assembly has an extended length; and
   said funnel assembly pivotally coupled to said support assembly and structured to move between a generally horizontal, first position, and a generally vertical, second position.

3. The watering assembly of claim 2 wherein when said funnel assembly is in said first configuration and said first position, said watering assembly is in a reduced space configuration relative to when said funnel assembly is in said operational configuration and said second position.

4. The watering assembly of claim 3 wherein, when said funnel assembly is in said first configuration and said first position, the height of said contained watering assembly is between about 50% to 65% of the height of said contained watering assembly when said funnel assembly is in said operational configuration and said second position.

5. The watering assembly of claim 3 wherein, when said funnel assembly is in said first configuration and said first position, the height of said contained watering assembly is about 60% of the height of said contained watering assembly when said funnel assembly is in said operational configuration and said second position.

6. The watering assembly of claim 2 wherein:
said support assembly includes a support member including an upper surface and a lower surface;
said support assembly support member upper surface defines an inlet assembly cavity;
said funnel assembly pivotally coupled to said support assembly support member at said inlet assembly cavity; and
wherein said funnel assembly is structured to move between a storage, first position, wherein said funnel assembly is at least partially disposed in said inlet assembly cavity, and an operation, second position, wherein said funnel assembly is disposed substantially outside said inlet assembly cavity.

7. The watering assembly of claim 1 wherein said first wicking assembly wicking elements is a directed capillary action assembly.

8. The watering assembly of claim 1 wherein:
said first wicking assembly wicking elements include a directed capillary action assembly;
said directed capillary action assembly including an elongated wick member
wherein, when said reservoir body enclosed space encloses a quantity of water, said wick member first portion is disposed in said water; and
wherein, when said reservoir body enclosed space encloses a quantity of water, said wick member transfers water from said reservoir body enclosed space to a location outside said reservoir body enclosed space.

9. The watering assembly of claim 1 wherein:
said support assembly includes a support member including an upper surface, a lower surface, and a number of vertical passages;
further including a second wicking assembly having second wicking element that includes a natural capillary action assembly;
said natural capillary action assembly including a number of tubular members each defining a generally enclosed space;
wherein each tubular member depends downwardly from said support assembly support member lower surface;
each tubular member including an upper opening and a number of lower openings;
each tubular member upper opening and each tubular member lower opening in fluid communication with said tubular member enclosed space; and
each tubular member upper opening in fluid communication with a support assembly support member vertical passage.

10. The watering assembly of claim 1 wherein said reservoir body is a unitary body.

11. A planter assembly comprising:
a planter including a body with a base member and an upwardly depending sidewall, said planter body defining an enclosed space;
a watering assembly including a reservoir body, a support assembly, a first wicking assembly, and an inlet assembly;
said reservoir body defining an enclosed space;
said support assembly structured to support a particulate material;
said support assembly coupled to said reservoir body and having a number of vertical passages;
said first wicking assembly including a number of first wicking elements, said first wicking elements coupled to the support assembly, said first wicking elements extending from said reservoir enclosed space to a location outside said reservoir enclosed space;
wherein said first wicking elements include tubular members each defining a generally enclosed space and depending from said support assembly, as well as being in fluid communication with one of said vertical passages;
said inlet assembly coupled to said reservoir body and structured to provide fluid communication from a location outside said reservoir enclosed space to said reservoir enclosed space;
wherein, when said reservoir body, said support assembly, said wicking assembly and said inlet assembly are assembled, said reservoir body, said support assembly, said wicking assembly and said inlet assembly form a contained watering assembly; and
said watering assembly disposed entirely within said planter body enclosed space.

12. The planter assembly of claim 11 wherein said watering assembly is structured to move between a reduced space configuration and an operational configuration.

13. The planter assembly of claim 11 wherein:
said inlet assembly includes a telescoping funnel assembly structured to move between a collapsed, first configuration, wherein the funnel assembly has a minimal length, and an expanded, operational configuration, wherein the funnel assembly has a maximum length; and
said funnel assembly pivotally coupled to said support assembly and structured to move between a generally horizontal, first position, and a generally vertical, second position.

14. The planter assembly of claim 13 wherein, when said funnel assembly is in said first configuration and said first position, the height of said contained watering assembly is between about 50% to 65% of the height of said contained watering assembly when said funnel assembly is in said operational configuration and said second position.

15. The planter assembly of claim 13 wherein, when said funnel assembly is in said first configuration and said first position, the height of said contained watering assembly is about 60% of the height of said contained watering assembly when said funnel assembly is in said operational configuration and said second position.

16. The planter assembly of claim 13 wherein:
said support assembly includes a support member including an upper surface and a lower surface;
said support assembly support member upper surface defines an inlet assembly cavity;

said funnel assembly pivotally coupled to said support assembly support member at said inlet assembly cavity; and wherein said funnel assembly is structured to move between a storage, first position, wherein said funnel assembly is at least partially disposed in said inlet assembly cavity, and an operation, second position, wherein said funnel assembly is disposed substantially outside said inlet assembly cavity.

17. The planter assembly of claim 11 wherein said wicking assembly wicking elements include at least one of a directed capillary action assembly or a natural capillary action assembly.

18. The planter assembly of claim 11, further comprising a second wicking assembly having at least one second wicking element;

said second wicking assembly second wicking element including a directed capillary action assembly;

said directed capillary action assembly including an elongated wick member with a first portion and a second portion;

said wick member first portion disposed in said reservoir body enclosed space;

said wick member second portion disposed outside said reservoir body enclosed space;

wherein, when said reservoir body enclosed space encloses a quantity of water, said wick member first portion is disposed in said water; and wherein, when said reservoir body enclosed space encloses a quantity of water, said wick member transfers water from said reservoir body enclosed space to a location outside said reservoir body enclosed space.

19. The planter assembly of claim 11 wherein:

said first wicking assembly wicking elements includes a natural capillary action assembly;

each tubular member including an upper opening and lower opening in fluid communication with said tubular member enclosed space; and each tubular member upper opening in fluid communication with a support assembly support member vertical passage.

20. The planter assembly of claim 11 wherein said reservoir body is a unitary body.

* * * * *